(12) United States Patent
Jackson

(10) Patent No.: US 11,412,396 B2
(45) Date of Patent: Aug. 9, 2022

(54) METHODS, SYSTEMS AND COMPUTER READABLE MEDIA FOR STIMULATING AND TESTING WIRELESS DEVICES

(71) Applicant: Keysight Technologies, Inc., Minneapolis, MN (US)

(72) Inventor: Stephen Samuel Jackson, Chapel Hill, NC (US)

(73) Assignee: KEYSIGHT TECHNOLOGIES, INC., Santa Rosa, CA (US)

(*) Notice: Subject to any disclaimer, the term of this patent is extended or adjusted under 35 U.S.C. 154(b) by 187 days.

(21) Appl. No.: 15/866,352

(22) Filed: Jan. 9, 2018

(65) Prior Publication Data
US 2019/0215707 A1    Jul. 11, 2019

(51) Int. Cl.
| H04B 17/16 | (2015.01) |
| H04B 17/29 | (2015.01) |
| H04B 17/391 | (2015.01) |
| H04W 24/06 | (2009.01) |

(52) U.S. Cl.
CPC ............ *H04W 24/06* (2013.01); *H04B 17/16* (2015.01); *H04B 17/29* (2015.01); *H04B 17/3912* (2015.01)

(58) Field of Classification Search
CPC .... H04B 17/16; H04B 17/29; H04B 17/3912; H04W 24/06
USPC .................................................. 370/252, 254
See application file for complete search history.

(56) References Cited

U.S. PATENT DOCUMENTS

| 8,490,876 B2 | 7/2013 | Tan et al. |
| 8,971,821 B2 | 3/2015 | Schlub et al. |
| 9,722,827 B2 | 8/2017 | Jackson |
| 2003/0148761 A1* | 8/2003 | Gaal ................. G01S 19/05 455/423 |
| 2006/0198359 A1 | 9/2006 | Fok et al. |
| 2010/0075678 A1 | 3/2010 | Akman et al. |
| 2013/0326274 A1 | 12/2013 | Olgaard et al. |
| 2014/0169177 A1* | 6/2014 | Popescu ............. H04B 17/29 370/241 |
| 2014/0357250 A1* | 12/2014 | Nitsan ................ H04W 4/60 455/418 |
| 2015/0113511 A1* | 4/2015 | Poulin ............. G06F 11/3457 717/135 |
| 2015/0318935 A1* | 11/2015 | Hudson ............. H04L 1/244 455/67.11 |

(Continued)

OTHER PUBLICATIONS

Panwar et al., "A Survey on 5G: The Next Generation of Mobile Communication," pp. 1-24 (Nov. 6, 2015).

*Primary Examiner* — Melvin C Marcelo
*Assistant Examiner* — Natali Pascual Peguero

(57) ABSTRACT

A method for testing wireless communications devices includes controlling a wireless environment simulator for creating a simulated wireless environment around a device under test (DUT). The DUT includes a wireless communications system. The method further includes stimulating the DUT as specified by a test case and recording, using a test monitor, one or more wireless signals transmitted between the DUT and the wireless environment simulator in response to stimulating the DUT. The method further includes generating a test result for the DUT based on comparing performance data from the wireless signals with expected performance specifications for the test case.

14 Claims, 6 Drawing Sheets

(56) References Cited

U.S. PATENT DOCUMENTS

| | | | |
|---|---|---|---|
| 2016/0105811 A1* | 4/2016 | Khurana | H04L 43/50 |
| | | | 370/252 |
| 2016/0283352 A1 | 9/2016 | Kraus et al. | |
| 2017/0242414 A1 | 8/2017 | Coote | |
| 2017/0264892 A1 | 9/2017 | Kuehnis et al. | |
| 2017/0303138 A1 | 10/2017 | Barmettler et al. | |
| 2017/0324617 A1* | 11/2017 | Prasad | H04W 24/06 |

* cited by examiner

METHODS, SYSTEMS AND COMPUTER READABLE MEDIA FOR STIMULATING AND TESTING WIRELESS DEVICES

TECHNICAL FIELD

The subject matter described herein relates to testing wireless devices. More particularly, the subject matter described herein relates to methods, systems, and computer readable media for testing wireless devices in wireless environments by stimulating wireless devices and monitoring the stimulated wireless devices.

BACKGROUND

The increasing prevalence of wireless access points is useful in enabling the Internet of Things (IoT), where physical objects are uniquely identifiable and able to interoperate with the Internet using embedded computing systems. Devices in the IoT can collect and report useful data and perform other functions. Testing IoT devices using conventional testing technology may be challenging where, for example, the conventional testing technology relies on supplying or executing instructions for a general purpose processor or standardized network hardware that is not present on an IoT device.

Accordingly, there exists a need for methods, systems, and computer readable media for testing wireless devices in wireless environments.

SUMMARY

A method for testing wireless communications devices includes controlling a wireless environment simulator for creating a simulated wireless environment around a device under test (DUT). The DUT includes a wireless communications system. The method further includes stimulating the DUT as specified by a test case and recording, using a test monitor, one or more wireless signals transmitted between the DUT and the wireless environment simulator in response to stimulating the DUT. The method further includes generating a test result for the DUT based on comparing performance data from the wireless signals with expected performance specifications for the test case.

A method for testing wireless communications devices includes receiving a model of a device under test (DUT), the DUT comprising a wireless communication system, the model comprising measured performance data for wireless signals transmitted by the DUT while testing the DUT in a physical wireless testing environment. The method includes simulating a virtual cellular environment and one or more virtual copies of the DUT in the virtual cellular environment using the model of the DUT. The method includes simulating an interaction between the virtual cellular environment and the virtual copies of the DUT. The method includes generating a test result for the DUT based on simulating the interaction between the virtual cellular environment and the virtual copies of the DUT.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

This specification describes systems, methods, and computer readable media for testing IoT devices and other types of wireless devices. A wireless device can be tested even though the wireless device may lack a general purpose processor, e.g., as may be the case for IoT devices such as wearable electronics and sensors that are powered by energy harvesting systems. A wireless device can be tested in a simulated wireless environment, e.g., a 5G cellular environment, based on comparing performance data from wireless signals with expected performance specifications.

Figure 1:
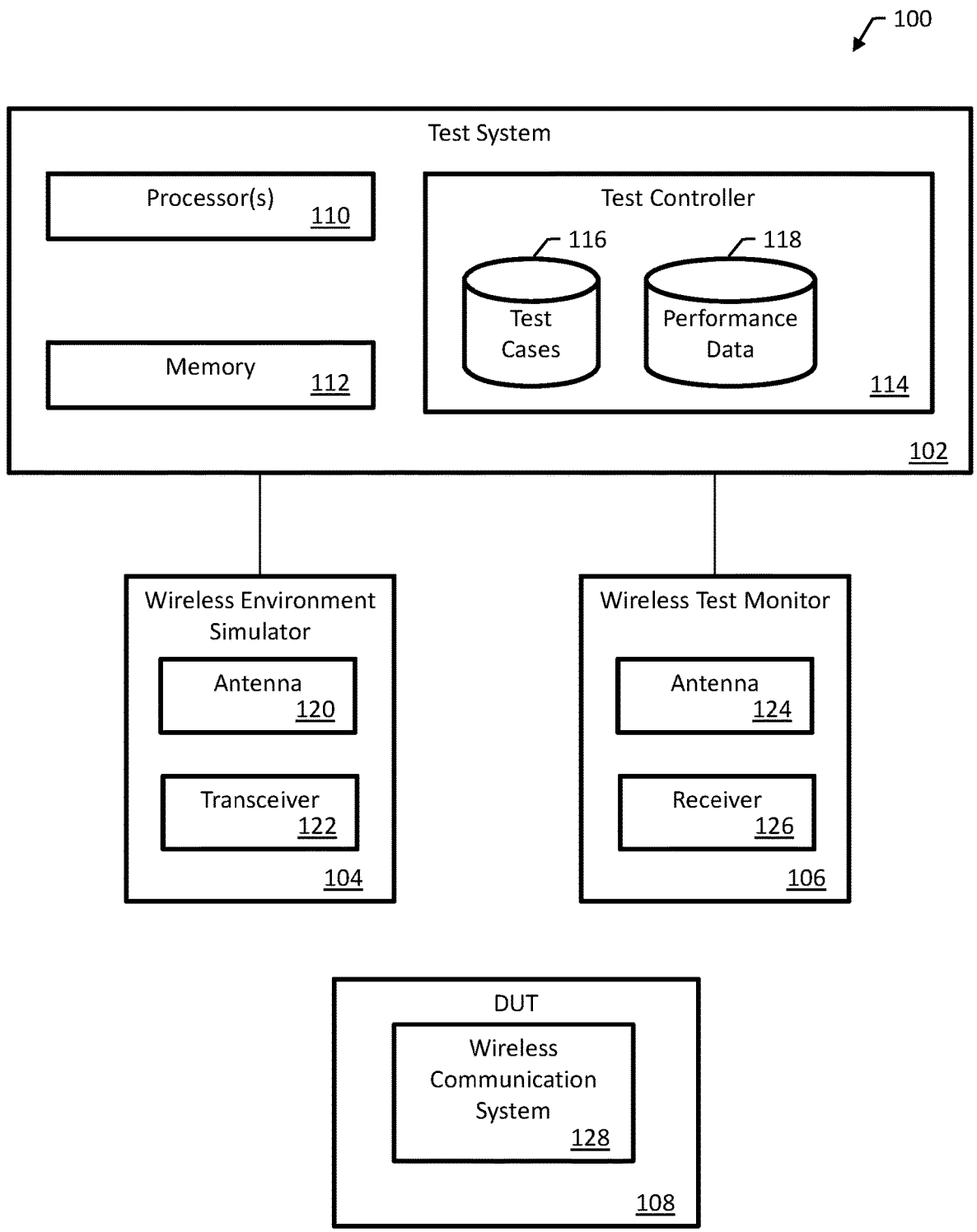
FIG. 1 is a diagram of an example wireless testing environment.

FIG. 1 is a diagram of an example wireless testing environment 100. Wireless testing environment 100 is a physical space where wireless service is provided, e.g., wireless service for a cellular telecommunications network. Wireless testing environment 100 includes a test system 102, a wireless environment simulator 104, a wireless test monitor 106, and a wireless device under test (DUT) 108.

Test system 102 is a computer system that includes at least one processor 110 and memory 112 storing executable instructions for processor 110. Test system 102 includes a test controller 114 that can be implemented using processor 110 and memory 112, e.g., as software executed by test system 102. Test controller 114 can include a repository of test cases 116 for different types of DUTs and, for each test case, performance data 118 for generating test results for the DUT. Test controller 114 is configured, by virtue of appropriate programming, for executing a test case for DUT 108.

Wireless environment simulator 104 can include at least one antenna 120 and a transceiver 122. Wireless environment simulator 104 is configured for creating a simulated wireless environment around DUT 108. For example, wireless environment simulator 104 can be configured for simulating a radio access network (RAN) for a cellular telecommunications network. Wireless environment simulator 104 then creates the simulated wireless environment by receiving and responding to messages in accordance with a telecommunications standard for the cellular telecommunications network. For example, wireless environment simulator 104 may be an evolvedNodeB (eNodeB) simulator, e.g., for a 5G cellular network.

Wireless test monitor 106 includes at least one antenna 124 and a receiver 126. Wireless test monitor 106 is configured for monitoring wireless communications between DUT 108 and wireless environment simulator 104. For example, receiver 126 can be configured, by virtue of appropriate hardware selection and design, to process both baseband and modulated signals and to process both in-phase and quadrature components of waveforms.

DUT 108 can be any appropriate type of wireless device. DUT 108 includes at least a wireless communication system 128 including, e.g., an antenna and a transmitter. For example, DUT 108 can be an IoT device such as a wearable electronic device or a sensor circuit.

In general, executing a test case includes stimulating the DUT 108 as specified by the test case. Executing a test case includes recording, using wireless test monitor 106, one or more wireless signals transmitted between DUT 108 and wireless environment simulator 104 in response to stimulating DUT 108. Executing a test case includes generating a test result for DUT 108 based on comparing performance data from the wireless signals with expected performance specifications for the test case.

A test result can be, e.g., a binary result such as pass or fail based on comparing performance data. For example, test controller 114 can determine the test result as a fail as a result of one or more measured test parameters deviating from specified test parameters by more than a threshold amount. Test controller 114 can also determine the test result as a fail if, e.g., a specified message is not received or not formatted as specified.

A test result can also be a value or a collection of values. For example, test controller 114 can determine a test result by determining a degree of deviation for each of one or more measured test parameters from specified test parameters. Test controller 114 can determine a test result by, e.g., measuring an amount of time between stimulating DUT 108 and receiving a specified message from DUT 108.

In general, test controller 114 can generate a test result using one or more of application layer responses, wireless signal quality measurements, and power consumption measurements. Application layer response monitoring can including evaluating application response actions in response to stimulating DUT 108, e.g., what application layer messages or data are sent. Wireless signal quality monitoring can include measure various signal quality metrics associated with signals transmitted by DUT 108, e.g., signal to noise ratio (SNR), signal power level, and protocol error detection. Test controller 114 can also be configured for evaluating sequence-oriented test outcomes.

To illustrate an example test case for testing DUT 108, consider the example expected performance data presented in Table 1.

TABLE 1

| Test Case ID | DUT Stimulation Profile | Expected Application Layer Response | Expected Power Consumption Response | Expected Signal Quality Response |
|---|---|---|---|---|
| 1 | Profile 1 | MessageID 045 | .124 pW | SNR, jitter |
| 2 | Profile 2 | No response | 0.0 mW | n/a |
| 3 | Profile 5 | MessageID 045, 069 | .345 pW | SNR, jitter |
| 4 | Profile 9 | MessageID 034 | .002 mW | SNR, jitter |

As shown in Table 1, a test case can include, for a given stimulation profile, one or more of an expected application layer response, an expected power consumption response, and an expected signal quality response.

Figure 2:
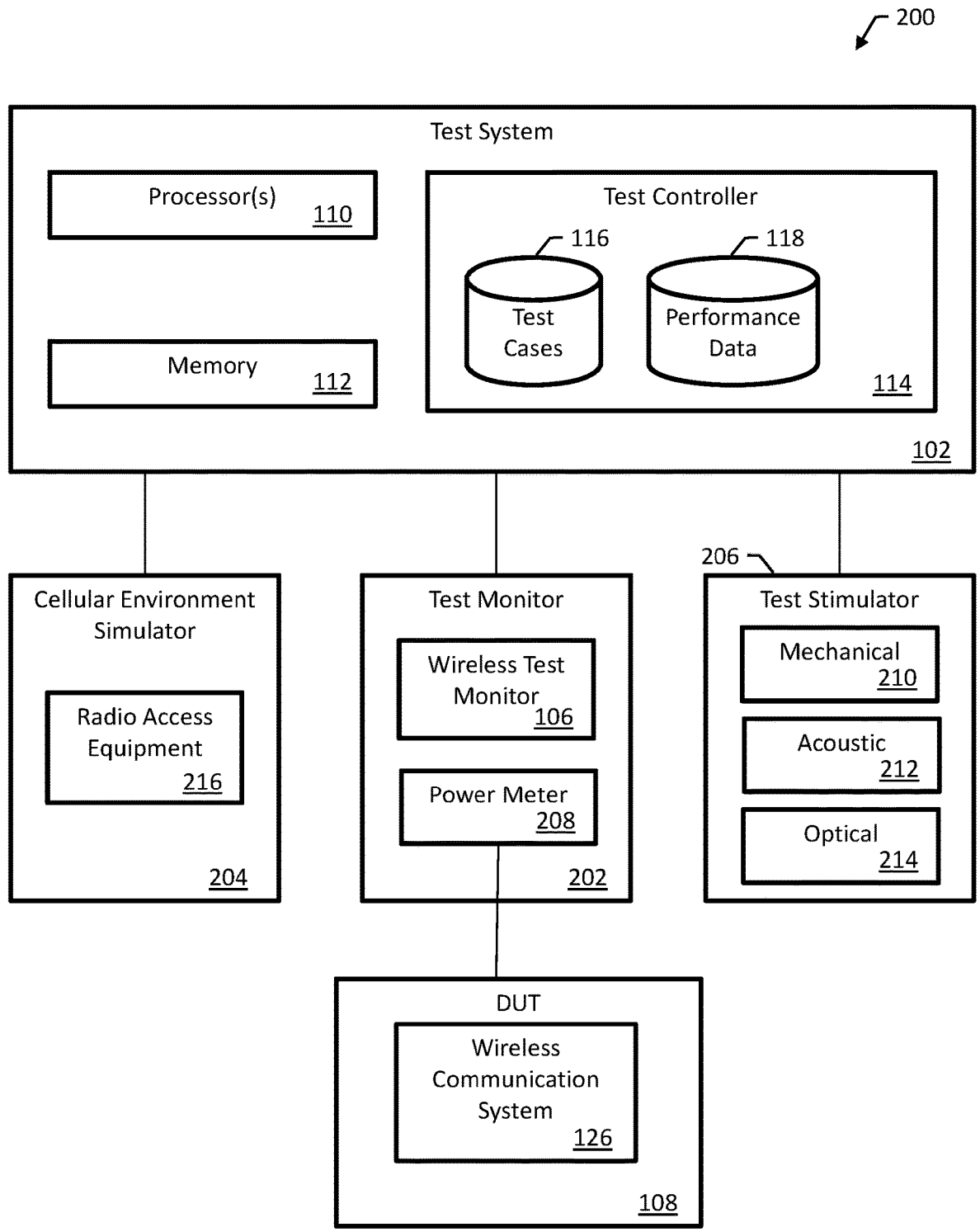
FIG. 2 is a diagram of another example wireless test environment.

FIG. 2 is a diagram of another example wireless test environment 200. Wireless test environment 200 includes the test system 102 and DUT 108 of FIG. 1. Wireless test environment 200 also includes a test monitor 202, a cellular environment simulator 204, and a test stimulator 206. Test monitor 202 includes the wireless test monitor 106 of FIG. 1 and a power meter 208. Cellular environment simulator 204 includes radio access equipment 216, e.g., antennas and wireless processing circuits for simulating a radio access network of a cellular telecommunications network.

Test stimulator 206 can include one or more different types of test stimulators. For example, test stimulator 206 can include a mechanical stimulator 210 such as a motion actuator configured for moving DUT 108, e.g., a shake table or a motion stage. Test stimulator 206 can include an acoustic actuator such as an audio speaker configured for directing an acoustic signal towards DUT 108, e.g., a voice recording, a synthesized voice, background noise, or a specific tone. Test stimulator 206 can include an optical source such as a light emitting diode (LED) configured for directing an optical signal towards DUT 108, e.g., shining 600 lumens of 3200° K light at DUT 108.

Test controller 114 is configured for stimulating DUT 108 using test stimulator 206 or cellular environment simulator 204 or both. Since test stimulator 206 may include different types of test stimulators, test controller 114 can be configured to test a variety of different types of DUTs. Including different types of test stimulators may be especially useful, e.g., in testing IoT devices and other wireless devices that may lack general purpose processors and full communications stacks. In particular, IoT devices may be configured to respond to unique stimuli to conserve energy, and test controller 114 can be configured, by virtue of appropriate programming, to reproduce the appropriate stimuli for various types of IoT devices using test stimulator 206 or cellular environment simulator 204 or both.

Since IoT devices may be configured for energy conservation, it may be useful to test power consumption during test cases at the same time as testing wireless performance. To test both wireless performance and power consumption, test monitor 202 can include a power meter 208. Power meter 208 may be coupled to an electric power supply that provides power to DUT 108. Test controller 114 can be configured to control power meter 208 to measure power consumed by DUT 108 at appropriate times during execution of a test case for DUT 108.

To illustrate an example test case for testing DUT 108, consider the example test stimulus data presented in Table 2.

TABLE 2

| Stimulus Profile | Stimulus Mode | Stimulus Profile Parameters |
|---|---|---|
| Profile 1 | Physical Motion | 2D Shake - Max Lateral Acceleration, duration = 2 s |
| Profile 2 | Acoustic | Profile2.mp3 |
| Profile 5 | Optical | Max lumens = 600, Temp (in deg K), duration = 4 hr |
| Profile 9 | Wireless | App Cmd 001, App Cmd 003 |

As shown in Table 2, a test case can include different stimulus profiles, different stimulus modes, and different stimulus profile parameters. Test controller 114 can be configured to stimulate DUT 108 by controlling test stimulator 206 to carry out each of the stimulus profiles, e.g., sequentially or by carrying out two or more at a same time. In response, test controller 114 can monitor the power consumption and wireless performance of DUT 108 using power meter 208 and wireless test monitor 106.

Figure 3A:
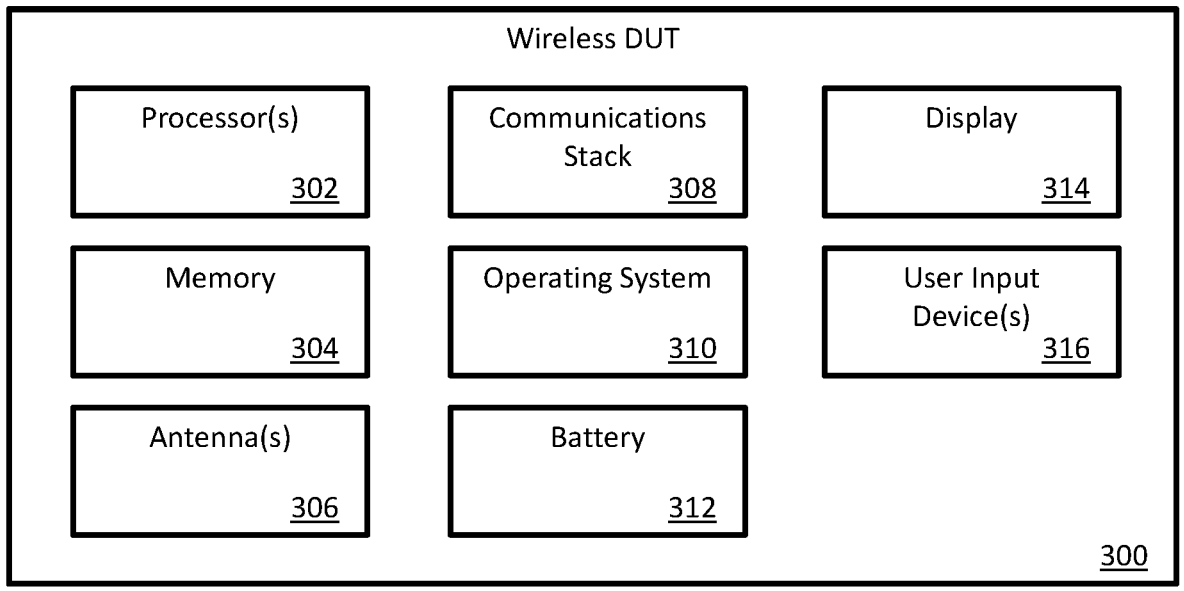
FIG. 3A is block diagram of an example wireless DUT.

FIG. 3A is block diagram of an example wireless DUT 300 that can be tested in the wireless testing environments 100 and 200 of FIGS. 1 and 2. Wireless DUT 300 includes at least one processor 302, memory 304, one or more antennas 306, a communications stack 308 for communicating with a wireless communications network, and an operating system 310. Wireless DUT 300 includes a battery 312, a display 314, and at least one user input device 316.

For example, wireless DUT 300 may be a mobile phone with a touchscreen user interface. Communications stack 308 is configured to communicate according to a communications protocol. The communications protocol can be, e.g., an 802.11 protocol, an 802.22 protocol, a long term evolution (LTE) protocol, an amplitude modulation (AM) or frequency modulation (FM) protocol, a phase modulation protocol, or a combination of protocols.

Test controller 114 can execute a test case for wireless DUT 300 by, e.g., sending commands to wireless DUT 300 over wireless environment simulator 104 or cellular environment simulator 204. Although wireless DUT 300 is illustrated as having battery 312, wireless DUT 300 may be configured for testing purposes to draw power from a power supply through power meter 208. Test controller 114 can use test monitor 202 to monitor wireless communications from wireless DUT 300 and power consumption of wireless DUT 300 while executing a test case.

Figure 3B:
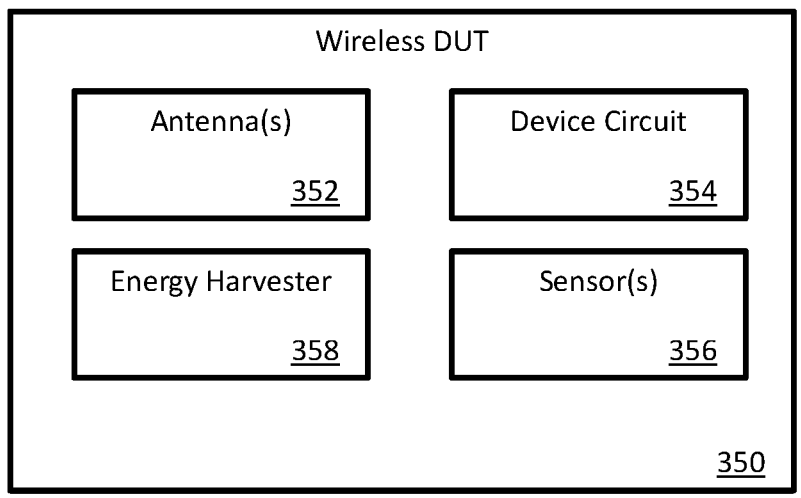
FIG. 3B is block diagram of another example wireless DUT.

FIG. 3B is block diagram of another example wireless DUT 350 that can be tested in the wireless testing environments 100 and 200 of FIGS. 1 and 2. Wireless DUT 350 includes one or more antennas 352 and a device circuit 354. Wireless DUT 350 includes one or more sensors 356 and an energy harvester 358.

Sensors 356 can include any appropriate combination of sensors, such as temperature, pressure, vibration, light, motion, humidity, or other types of sensors. In general, sensors 356 produce an electrical response that device circuit 354 can receive an convert into data or wireless signals to transmit over antennas 306. Energy harvester 358 is a circuit configured for deriving power from external sources, e.g., solar power, thermal energy, wind energy, salinity gradients, or kinetic energy. Device circuit 354 can be configured to respond to certain stimuli by wirelessly transmitting sensor data from sensors 356 using antennas 352.

Wireless DUT 350 lacks a communications stack and an operating system, perhaps to reduce the size, weight, and cost of wireless DUT 350. As a result, it may not be possible to test wireless DUT 350 in some conventional testing environments. Wireless DUT 350 may be configured to perform certain actions in response to specific stimuli or sequences of stimuli. Wireless DUT 350 can be tested in testing environments 100 and 200 by virtue of test controller 114 being programmed to provide the appropriate stimuli and monitor the appropriate response. Although wireless DUT 350 is illustrated as having energy harvester 358, DUT 350 may be configured for testing purposes to draw power from a power supply through power meter 208. Test controller 114 can use test monitor 202 to monitor wireless communications from wireless DUT 350 and power consumption of wireless DUT 300 while executing a test case.

For example, consider the following test case for wireless DUT 350. Suppose that wireless DUT 350 derives power for device circuit 354 from energy harvester 358, and energy harvester 358 is configured to generate power from kinetic energy (e.g., using a magnet that, in motion, provides a rate of change of flux, resulting in an induced electromagnetic field on a coil assembly) or other environmental power sources (e.g., using photovoltaic solar cells). Test controller 114 can be configured to stimulate wireless DUT 350, monitor stimulation power provided/applied to wireless DUT 350, and monitor one or more wireless signal characteristics of a responsive signal generated by wireless DUT 350. Test controller 114 can determine a test result for wireless DUT 350 based on the stimulation power and wireless signal characteristics.

Figure 4:
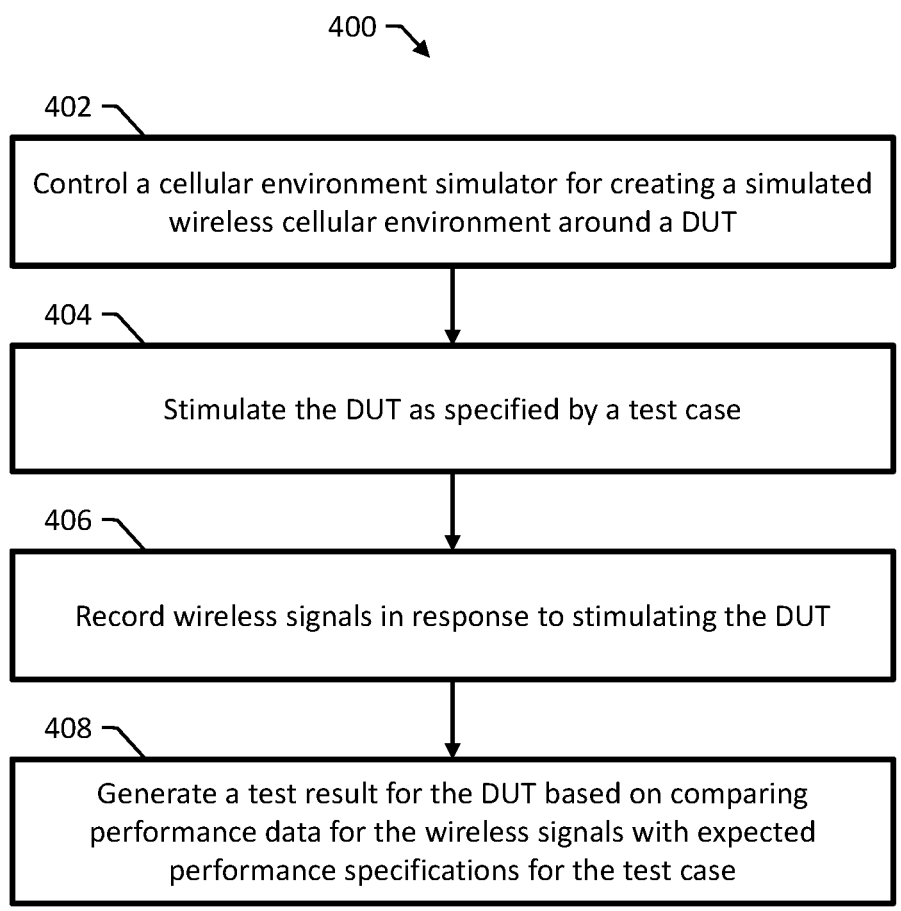
FIG. 4 is a flow diagram of an example method for testing wireless communications devices.

FIG. 4 is a flow diagram of an example method 400 for testing wireless communications devices. Method 400 can be performed, e.g., by the test controller 114 of FIGS. 1 and 2.

Method 400 includes controlling a wireless environment simulator for creating a simulated wireless cellular environment around a DUT (402). Creating the simulated wireless environment can include simulating a radio access network for a cellular telecommunications network by receiving and responding to messages in accordance with a telecommunications standard for the telecommunications network.

Method 400 includes stimulating the DUT as specified by a test case (404). Stimulating the DUT can include causing one or more motion actuation events to cause the DUT to move as specified for the test case. Stimulating the DUT can include causing one or more acoustic actuation events to direct an acoustic signal towards the DUT as specified for the test case. Stimulating the DUT can include causing one or more optical actuation events to direct an optical signal towards the DUT as specified for the test case.

Stimulating the DUT can include transmitting, using the simulated cellular environment, one or more DUT control commands to the DUT as specified for the test case. Transmitting the DUT control commands can include controlling the wireless environment simulator to transmit the DUT control commands. In some examples, method 400 includes controlling the wireless environment simulator to complete a simulated call with the DUT using the simulated wireless environment.

Method 400 includes recording, using a test monitor, one or more wireless signals transmitted between the DUT and the wireless environment simulator in response to stimulating the DUT (406). In some examples, method 400 includes monitoring, using a power meter, power consumed by the DUT while executing the test case.

Method 400 includes generating a test result for the DUT based on comparing performance data from the wireless signals with expected performance specifications for the test case (408). In some examples, generating the test result includes generating the test result based on both the performance data from the wireless signals and performance data from the power consumption data recorded using the power meter. For example, generating the test result can include generating a "pass" result if both the wireless performance data and the power consumption data are within ranges specified by the performance specifications.

Figure 5:
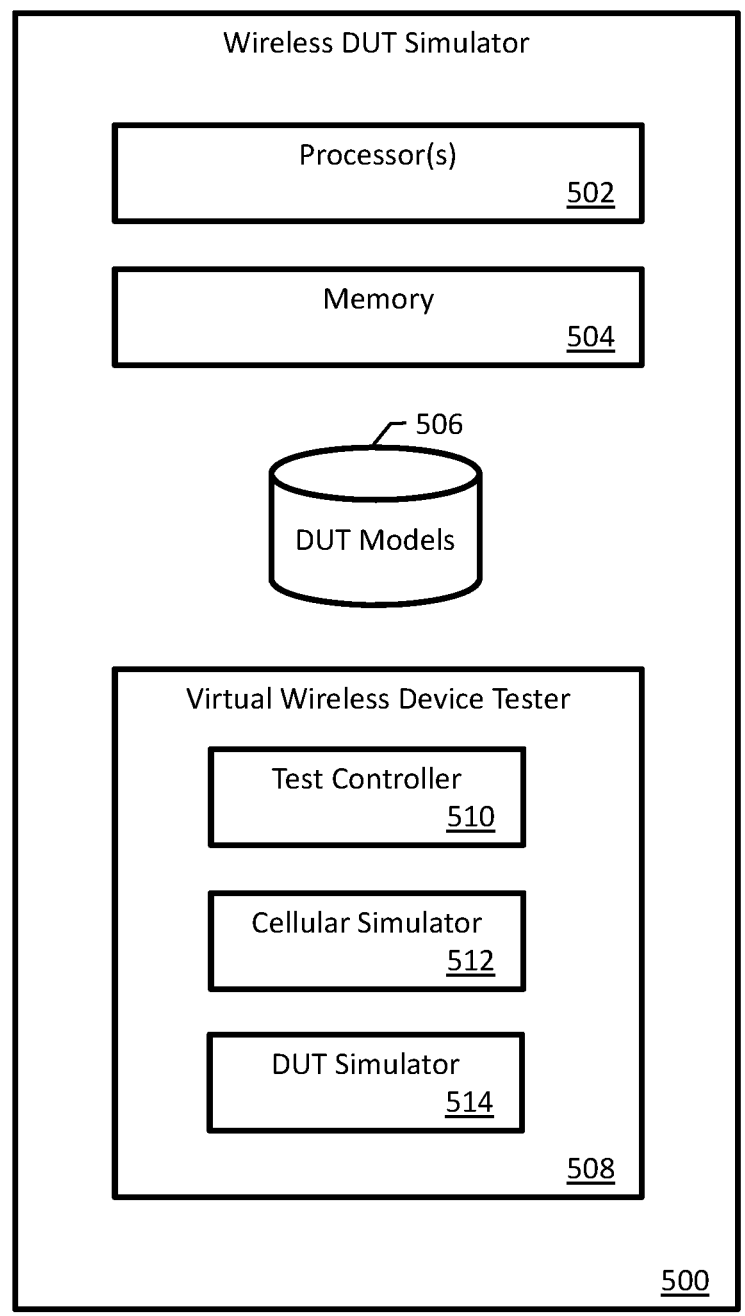
FIG. 5 is a block diagram of a wireless DUT simulator implemented as a computer system.

FIG. 5 is a block diagram of a wireless DUT simulator implemented as a computer system 500. System 500 includes at least one processor 502 and memory storing executable instructions for processor 502. System 500 includes a data storage repository 506 for storing models of wireless DUTs, e.g., models received from the test controller 114 of FIGS. 1 and 2. System 500 includes a virtual wireless device tester 508 implemented, e.g., by virtue of appropriate programming, using processor 502 and memory 504. Virtual wireless device tester 508 includes a test controller 510, a cellular simulator 512, and a DUT simulator 514.

In operation, virtual wireless device tester 508 is configured for replicating virtual DUT copies in a simulated environment. Replicating virtual DUT copies may be useful, e.g., since it may be technically difficult to hardware-test DUTs at numeric scale. Virtual wireless device tester 508 can be configured to replicate a number copies of virtual DUTs using a model of the DUT and to analyze the copies of the virtual DUTs in a simulated cellular environment.

Figure 6:
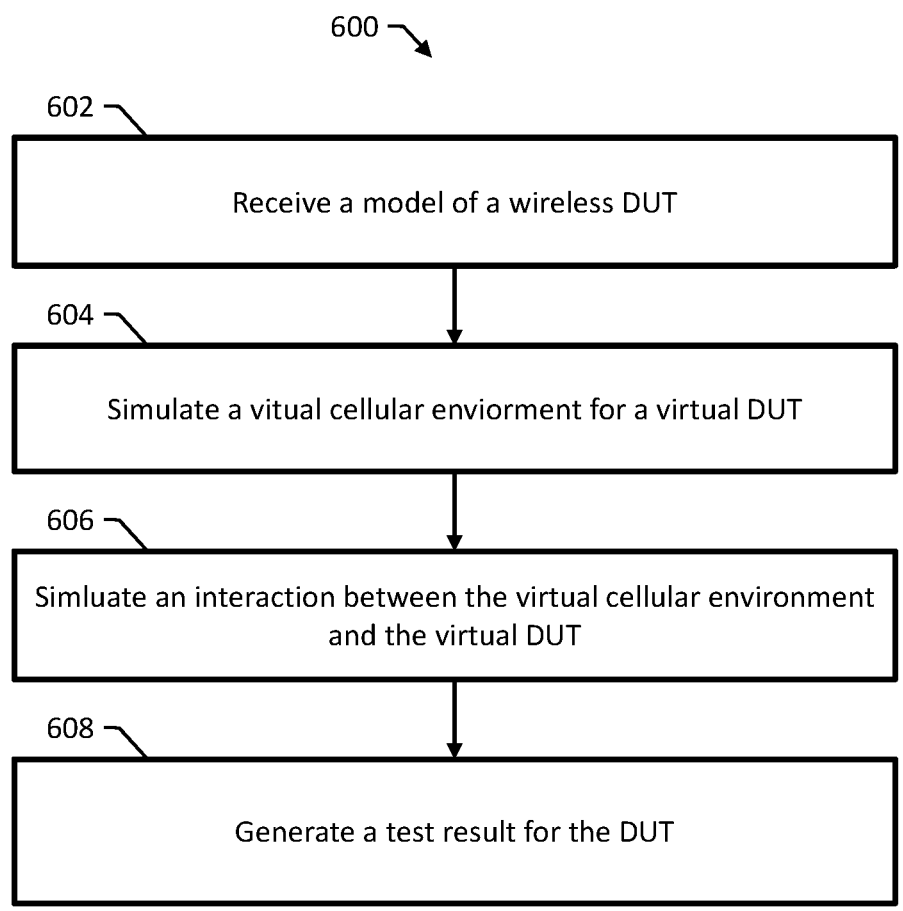
FIG. 6 is a flow diagram of an example method for testing wireless communication devices.

FIG. 6 is a flow diagram of an example method 600 for testing wireless communication devices. The method 600 can be performed, e.g., by the test controller 510 of FIG. 5 controlling the cellular simulator 512 and DUT simulator 514 of FIG. 5.

Method 600 includes receiving a model of a DUT, e.g., the wireless DUT 300 of FIG. 3A or the wireless DUT 350 of FIG. 3B (602). The model includes measured performance data for wireless signals transmitted by the DUT while testing the DUT in a physical wireless testing environment, e.g., the testing environment 100 of FIG. 1 or the testing environment 200 of FIG. 2.

Method 600 includes simulating a virtual cellular environment and one or more virtual copies of the DUT in the virtual cellular environment using the model of the DUT (604). Simulating the virtual cellular environment can include simulating virtual copies of the DUT and varying, for each virtual copy of the DUT, one or more parameters specified in the model of the DUT. For example, varying parameters for each virtual copy of the DUT can include varying one or more of: DUT location, DUT identifier numbers, and DUT sensor capabilities.

Method 600 includes simulating an interaction between the virtual cellular environment and the virtual copies of the DUT (606). For example, simulating an interaction can include stimulating the virtual copies of the DUT as described above with reference to FIG. 4 using virtual stimuli. Method 600 includes generating a test result for the DUT based on simulating the interaction between the virtual cellular environment and the virtual copies of the DUT (608). For example, generating a test result can include comparing simulated performance data with expected performance data.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for testing wireless communication devices, the system comprising:
   a wireless environment simulator configured for creating a simulated wireless environment around a device under test (DUT), the DUT comprising a wireless communication system, wherein the wireless environment simulator comprises at least one antenna and a transceiver, and wherein creating the simulated wireless environment comprises simulating a radio access network for a cellular telecommunications network by receiving and responding to messages in accordance with a telecommunications standard for the cellular telecommunications network;
   a test monitor configured for monitoring wireless communications, wherein the test monitor is a physical test monitor distinct from the wireless environment simulator and configured for receiving radio signals exchanged between the wireless environment simulator and the DUT, wherein the test monitor is configured for intercepting the radio signals exchanged between the DUT and the at least one antenna and transceiver of the wireless environment simulator and measuring one or more signal quality metrics for wireless signal quality monitoring of the radio signals exchanged between the DUT and the at least one antenna and transceiver of the wireless environment simulator; and
   a test controller configured for executing a test case by stimulating the DUT, using the test monitor for recording one or more wireless signals transmitted between the DUT and the wireless environment simulator in response to stimulating the DUT, and generating a test result for the DUT based on comparing performance data from the wireless signals with expected performance specifications for the test case;
   wherein stimulating the DUT comprises transmitting, using the at least one antenna and the transceiver of the simulated wireless environment, one or more DUT control commands to the DUT as specified for the test case;
   wherein transmitting the DUT control commands comprises controlling the wireless environment simulator to transmit the DUT control commands using the at least one antenna and the transceiver.

2. The system of claim 1, comprising a motion actuator configured for moving the DUT, wherein stimulating the DUT comprises causing, using the motion actuator, one or more motion actuation events to cause the DUT to move as specified for the test case.

3. The system of claim 1, comprising an acoustic actuator, wherein stimulating the DUT comprises causing, using the acoustic actuator, one or more acoustic actuation events to direct an acoustic signal towards the DUT as specified for the test case.

4. The system of claim 1, comprising an optical source, wherein stimulating the DUT comprises causing, using the optical source, one or more optical actuation events to direct an optical signal towards the DUT as specified for the test case.

5. The system of claim 1, comprising a power meter, wherein executing the test case comprises monitoring, using the power meter, power consumed by the DUT while the test controller is executing the test case.

6. The system of claim 1, wherein executing the test case comprises controlling the wireless environment simulator to complete a simulated call with the DUT using the simulated wireless environment.

7. The system of claim 1, wherein the DUT comprises one or more sensors, and wherein stimulating the DUT comprises causing the DUT to transmit sensor data from the sensor using the simulated wireless environment.

8. A method for testing wireless communications devices, the method comprising:
   controlling a wireless environment simulator for creating a simulated wireless cellular environment around a device under test (DUT), the DUT comprising a wireless communication system, wherein the wireless environment simulator comprises at least one antenna and a transceiver, and wherein creating the simulated wireless environment comprises simulating a radio access network for a cellular telecommunications network by receiving and responding to messages in accordance with a telecommunications standard for the cellular telecommunications network;

stimulating the DUT as specified by a test case;

recording, using a test monitor, one or more wireless signals transmitted between the DUT and the wireless environment simulator in response to stimulating the DUT, wherein the test monitor is a physical test monitor distinct from the wireless environment simulator and configured for receiving radio signals exchanged between the wireless environment simulator and the DUT, wherein the one or more wireless signal comprises intercepting the radio signals exchanged between the DUT and the at least one antenna and transceiver of the wireless environment simulator and measuring one or more signal quality metrics for wireless signal quality monitoring of the radio signals exchanged between the DUT and the at least one antenna and transceiver of the wireless environment simulator; and generating a test result for the DUT based on comparing performance data from the wireless signals with expected performance specifications for the test case;

wherein stimulating the DUT comprises transmitting, using the at least one antenna and the transceiver of the simulated wireless environment, one or more DUT control commands to the DUT as specified for the test case;

wherein transmitting the DUT control commands comprises controlling the wireless environment simulator to transmit the DUT control commands using the at least one antenna and the transceiver.

9. The method of claim 8, wherein stimulating the DUT comprises causing one or more motion actuation events to cause the DUT to move as specified for the test case.

10. The method of claim 8, wherein stimulating the DUT comprises causing one or more acoustic actuation events to direct an acoustic signal towards the DUT as specified for the test case.

11. The method of claim 8, wherein stimulating the DUT comprises causing one or more optical actuation events to direct an optical signal towards the DUT as specified for the test case.

12. The method of claim 8, wherein executing the test case comprises monitoring, using a power meter, power consumed by the DUT while executing the test case.

13. The method of claim 8, comprising controlling the wireless environment simulator to complete a simulated call with the DUT using the simulated wireless environment.

14. The method of claim 8, wherein the DUT comprises one or more sensors, and wherein stimulating the DUT comprises causing the DUT to transmit sensor data from the sensor using the simulated wireless environment.

* * * * *